United States Patent
Lee et al.

(10) Patent No.: US 9,033,231 B2
(45) Date of Patent: May 19, 2015

(54) AUTOMATIC CORRECTION APPARATUS FOR TRAJECTORY OF A PROJECTILE AND CORRECTION METHOD USING THE SAME

(75) Inventors: Dong Hee Lee, Gyeonggi-do (KR); In Jung, Gyeonggi-do (KR); Gyu Jung Choi, Incheon (KR)

(73) Assignee: In Jung, Bucheon-si (KR)

( * ) Notice: Subject to any disclaimer, the term of this patent is extended or adjusted under 35 U.S.C. 154(b) by 230 days.

(21) Appl. No.: 13/110,208

(22) Filed: May 18, 2011

(65) Prior Publication Data

US 2011/0284634 A1 Nov. 24, 2011

(30) Foreign Application Priority Data

May 19, 2010 (KR) .................. 10 2010 0046977

(51) Int. Cl.
| | |
|---|---|
| G06G 7/80 | (2006.01) |
| F41G 1/00 | (2006.01) |
| F41G 1/38 | (2006.01) |
| F41G 3/06 | (2006.01) |
| F41G 1/473 | (2006.01) |
| F41G 3/32 | (2006.01) |

(52) U.S. Cl.
CPC ........ F41G 3/06 (2013.01); F41G 1/473 (2013.01); F41G 3/323 (2013.01)

(58) Field of Classification Search
USPC .............. 235/404, 407; 42/137, 111, 125; 359/399
See application file for complete search history.

(56) References Cited

U.S. PATENT DOCUMENTS

| | | | | | |
|---|---|---|---|---|---|
| 4,437,384 | A | * | 3/1984 | Tassie | 89/37.02 |
| 5,375,072 | A | * | 12/1994 | Cohen | 702/94 |
| 6,252,706 | B1 | * | 6/2001 | Kaladgew | 359/399 |
| 7,806,331 | B2 | * | 10/2010 | Windauer et al. | 235/404 |
| 8,109,028 | B2 | * | 2/2012 | Roberts et al. | 42/94 |
| 2005/0039370 | A1 | * | 2/2005 | Strong | 42/130 |
| 2011/0154713 | A1 | * | 6/2011 | Jung et al. | 42/137 |

FOREIGN PATENT DOCUMENTS

| KR | 20070058987 A | 6/2007 |
|---|---|---|
| KR | 101052824 | 7/2011 |

* cited by examiner

*Primary Examiner* — Daniel Hess
(74) *Attorney, Agent, or Firm* — Baker & McKenzie LLP

(57) ABSTRACT

Disclosed is an automatic correction apparatus for a trajectory of a projectile from a firearm of which a sight and a gun barrel are installed in parallel, the apparatus including: a distance measurer which is installed in parallel with the sight and measures distance from a target to be hit; a central processing unit which calculates a correction value for parallelization between the gun barrel and the sight so that a trajectory curve and the target can intersect with each other on the basis of the distance measured by the distance measurer; and a parallelization adjuster which connects the sight and the gun barrel and adjusts axial parallelization between a sight line of the sight and the gun barrel on the basis of the parallelization correction value calculated by the central processing unit. With this, the trajectory of the projectile is automatically corrected in accordance with the distance from the target, and thus quick and correct aiming and firing are possible.

9 Claims, 16 Drawing Sheets

AUTOMATIC CORRECTION APPARATUS FOR TRAJECTORY OF A PROJECTILE AND CORRECTION METHOD USING THE SAME

CROSS-REFERENCE TO RELATED APPLICATION

This application claims priority to and the benefit of Korean Patent Application No. 10-2010-0046977 filed in the Korean Intellectual Property Office on May 19, 2010, the entire contents of which are incorporated herein by reference.

BACKGROUND OF THE INVENTION (a) Field of the Invention

The present invention relates to an automatic correction apparatus for a trajectory of a projectile, and more particularly, to an automatic correction apparatus for a trajectory of a projectile, which can remarkably improve quick action to targets at various distances, and a correction method using the same.

(b) Description of the Related Art

The existing firearms have hitherto employed a target aiming method using a front sight and a rear sight, but this method has shortcomings as follows: it takes long time to line up a sight line, a gun barrel and a target; precision is significantly deteriorated; and a lot of bullets are consumed until hitting the target. To solve these shortcomings, an optical sight based on a dot sight has been developed. Such a dot sight is configured to hit a target point when fired even though a shooters sight line is not aligned with the gun barrel of the firearm as long as a dot reflected on an inner mirror of the sight is aligned with the external target. This dot sight must be more improved than the conventional method in which the front sight and the rear sight are used and the target can be hit by firing only when the shooter's sight fine is aligned with the gun barrel of the firearm. That is, the optical sight based on the dot sight can largely reduce time taken in lining up the shooter's sight line, the gun barrel of the firearm, and a target point, thereby showing its ability even in a situation required to be quickly coped with.

As shown in FIG. 1, such a conventional optical sight based on a dot sight includes an inner body tube alignment adjuster 7 on a top of a sighting housing 2, a lower fixing grill 26 detachably connected in the form of rail to an upper end of a rear sight package of a rifle, a protective window 10 in a front end of the housing 2, a light emitting diode (LED) 8 serving as a light source at a predetermined position of the upper end of the inner tube body of the housing 2, and a reflective mirror 9 having a certain curvature and placed behind the protective window 10 within the housing 2.

In general, the reflective mirror 9 is coated so that an observer's (i.e., a user's) eyes can view a front end of the optical sight 1 based on the dot sight and an LED light point of a light beam having a wavelength of about 650 nm can be reflected. The reflective mirror 9 allows the observer's (i.e., the user's) eyes to view the front end of a dot sight device 1 and reflects the light point of the LED 8 emitting the light beam having a wavelength of about 650 nm toward a rear end. The observer (i.e., the user) fires when the light point of the LED is matched with the target, and it is thus easy to aim at the target. In theory, a spot light source made by the LED 8 placed within the optical sight 1 based on the dot sight is intended to be reflected from the reflective mirror 9 and incident in parallel with the observer's eyes, and this parallelization is intended to be aligned with a bullet firing axis of the firearm. However, if the parallelization of the optical sight 1 based on the dot sight is not aligned with the bullet firing axis of the firearm, the target point cannot be hit even though the observer lines up a beam dot of the LED 8 with the target point. Therefore, in order to line up the parallelization of the optical sight 1 based on the dot sight with the bullet firing axis of the firearm, the inner tube body adjuster 7 having vertical and horizontal functions is provided to thereby align an optical axis of the inner tube body with the bullet firing axis of the gun barrel.

Meanwhile, if the target point is varied in distance, such an optical sight based on the dot sight sometimes fails in hitting the target point even though the dot of the dot sight is aligned with the target point. Accordingly, a patent (Korean Patent No. 10-0906159) for an optical sight using a dot sight has been granted and provided, in which a distance-based rear sight or a means having a similar function with the means for manually adjusting the height of the front sight like the method using the front sight and the rear sight is applied to the optical sight using the dot sight, so that the optical axis of the dot sight, the parallelization of the gun barrel axis, and horizontal correction can be manually adjusted in accordance with distance to thereby correct a trajectory.

However, if a plurality of targets approaches from various distances or moves, the optical sight using the dot sight with a manual trajectory correction means may be deteriorated in speed of carrying out manual corrections one by one. That is, to take change in an impact point according to distance into account, parallelization between an optical axis of a dot sight main body and a firing axis of the gun barrel was mechanically adjusted and used. However, the mechanical adjustment causes a deadly problem that distance change cannot be quickly coped with, and therefore a target may be missed or an effective hit according to situations is impossible.

SUMMARY OF THE INVENTION

Accordingly, the present invention is conceived to solve the forgoing problems, and an aspect of the present invention is to provide an automatic correction apparatus for a trajectory of a projectile, in which distance from a target is measured by a distance measurer, and parallelization between a gun barrel and a sight is automatically adjusted in accordance with the measured distance so that a trajectory curve can intersect the target, thereby making sighting and firing quick and correct.

Another aspect of the present invention is to provide an automatic correction apparatus for a trajectory of a projectile, in which a sensor for sensing parallelization between a gun barrel and a sight so as to prevent an error in setting up the parallelization.

Still another aspect of the present invention is to provide an automatic correction apparatus for a trajectory of a projectile, in which the parallelization is automatically and manually adjustable so as to effectively and well-directly dealing with various neighboring environments.

An exemplary embodiment of the present invention provides an automatic correction apparatus for a trajectory of a projectile from a firearm of which a sight and a gun barrel are installed in parallel, the apparatus including: a distance measurer which is installed in parallel with the sight and measures distance from a target to be hit; a central processing unit which calculates a correction value for parallelization between the gun barrel and the sight so that a trajectory curve and the target can intersect with each other on the basis of the distance measured by the distance measurer; and a parallelization adjuster which connects the sight and the gun barrel and adjusts axial parallelization between a sight line of the sight and the gun barrel on the basis of the parallelization correction value calculated by the central processing unit.

The parallelization adjuster may include a slave gear installed in the sight, and a driving unit engaged with the slave gear and driven on the basis of the parallelization correction value of the central processing unit.

The parallelization adjuster may include a manual rotator to be rotated by manipulation of a user, a manual gear formed coaxially with the manual rotator and engaged with the slave gear, and a changeover switch controlling only one of the manual gear and the driver to be engaged with the slave gear.

The parallelization adjuster may include a sensor which measures parallelization between opposite fixed ends and transmits the measured parallelization to the central processing unit.

The apparatus may further include a posture controller installed in the firearm and controlling a sighting position of the firearm.

The apparatus may further include a posture controller installed in the sight and controlling a sighting position of the sight; and a base installed on a bottom and supporting the posture controller to be rotatable in all of up, down, left and right directions.

The apparatus may further include a posture controller installed in the firearm and controlling a sighting position of the gun barrel; a base installed on a bottom and supporting the posture controller to be rotatable in all of up, down, left and right directions; and a second parallelization adjuster having the same configuration as the parallel adjuster installed between the firearm and the sight, installed between the posture controller and the firearm, and driven in an opposite direction to the parallelization adjuster installed between the sight and the firearm so that the sight line of the sight can be aligned with the target.

Another exemplary embodiment of the present invention provides a correction method using the foregoing automatic correction apparatus for the trajectory of the projectile, the method including: aiming the sight line of the sight at the target by adjusting the sighting position of the gun barrel through the posture controller; measuring the distance from the target through the distance measurer; calculating the correction value for the parallelization between the gun barrel and the sight to correct the trajectory on the basis of the distance from the target; correcting the trajectory by adjusting the parallelization of the sight with regard to the gun barrel through the parallelization adjuster installed between the sight and the gun barrel on the basis of the parallelization correction value; and aiming the sight line of the sight, of which the parallelization is adjusted while correcting the trajectory, at the target again.

Still another exemplary embodiment of the present invention provides a correction method using the foregoing automatic correction apparatus for the trajectory of the projectile, the method including: aiming the sight line of the sight at the target by adjusting the sighting position of the sight through the posture controller; measuring the distance from the target through the distance measurer; calculating the correction value for the parallelization between the gun barrel and the sight to correct the trajectory on the basis of the distance from the target; and correcting the trajectory by adjusting the parallelization of the gun barrel with regard to the sight through the parallelization adjuster installed between the sight and the gun barrel on the basis of the parallelization correction value.

Another exemplary embodiment of the present invention provides a correction method using the foregoing automatic correction apparatus for the trajectory of the projectile, the method including aiming the sight line of the sight at the target by adjusting the sighting position of the gun barrel through the posture controller; measuring the distance from the target through the distance measurer; calculating the correction value for the parallelization between the gun barrel and the sight to correct the trajectory on the basis of the distance from the target; performing first parallelization correction for correcting the trajectory by driving the parallelization adjuster installed between the sight and the gun barrel to adjust the parallelization of the sight with regard to the gun barrel on the basis of the parallelization correction value; and performing second parallelization correction for aligning the sight line of the sight with the target by driving the parallelization adjuster installed between the posture adjuster and the firearm in an opposite direction to the parallelization adjuster installed between the sight and the firearm.

BRIEF DESCRIPTION OF THE DRAWINGS

The above and/or other aspects of the present invention will become apparent and more readily appreciated from the following description of the exemplary embodiments, taken in conjunction with the accompanying drawings, in which.

DETAILED DESCRIPTION OF THE EMBODIMENTS

Figure 1:
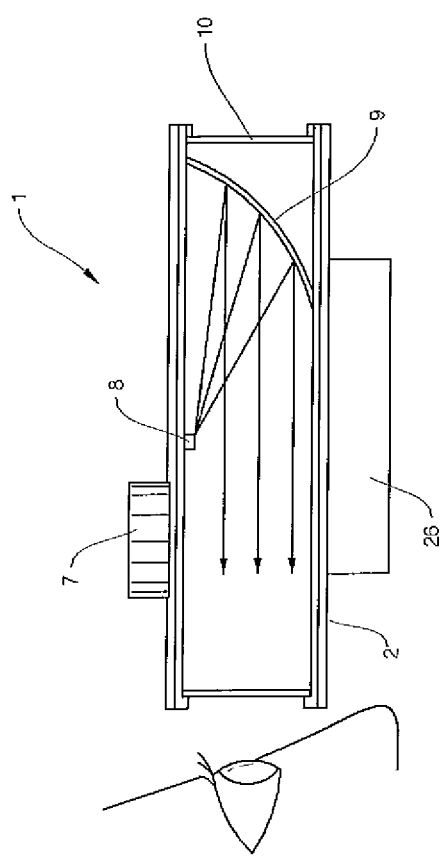
FIG. 1 is a cross-section view of a conventional optical sight based on a dot sight.

Prior to description, elements will be representatively explained in a first embodiment and only different configurations will be described in another embodiment, in which like reference numerals refer to like elements throughout the embodiments.

Hereinafter, an automatic correction apparatus for a trajectory of a projectile according to a first exemplary embodiment of the present invention will be described with reference to the accompanying drawings.

Figure 2:
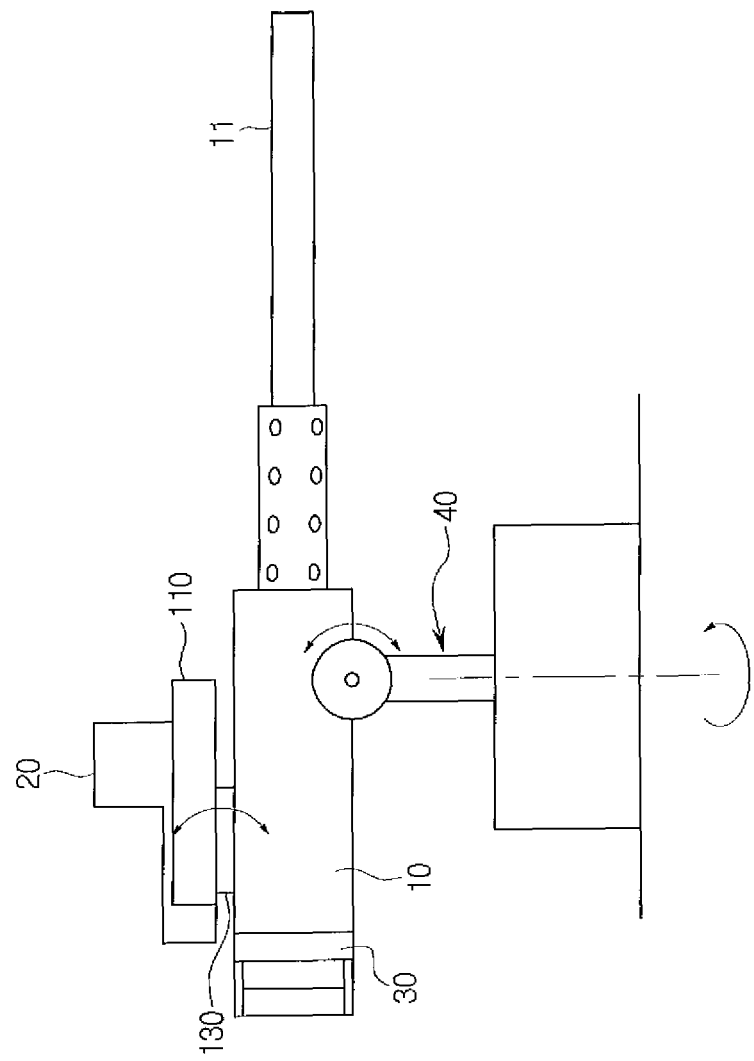
FIG. 2 is a lateral view of an automatic correction apparatus for a trajectory of a projectile according to an exemplary embodiment of the present invention.
Figure 3:
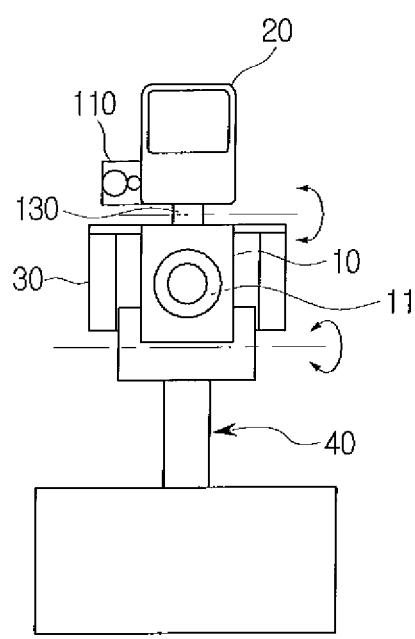
FIG. 3 is a front view of an automatic correction apparatus for a trajectory of a projectile according to an exemplary embodiment of the present invention.
Figure 4:
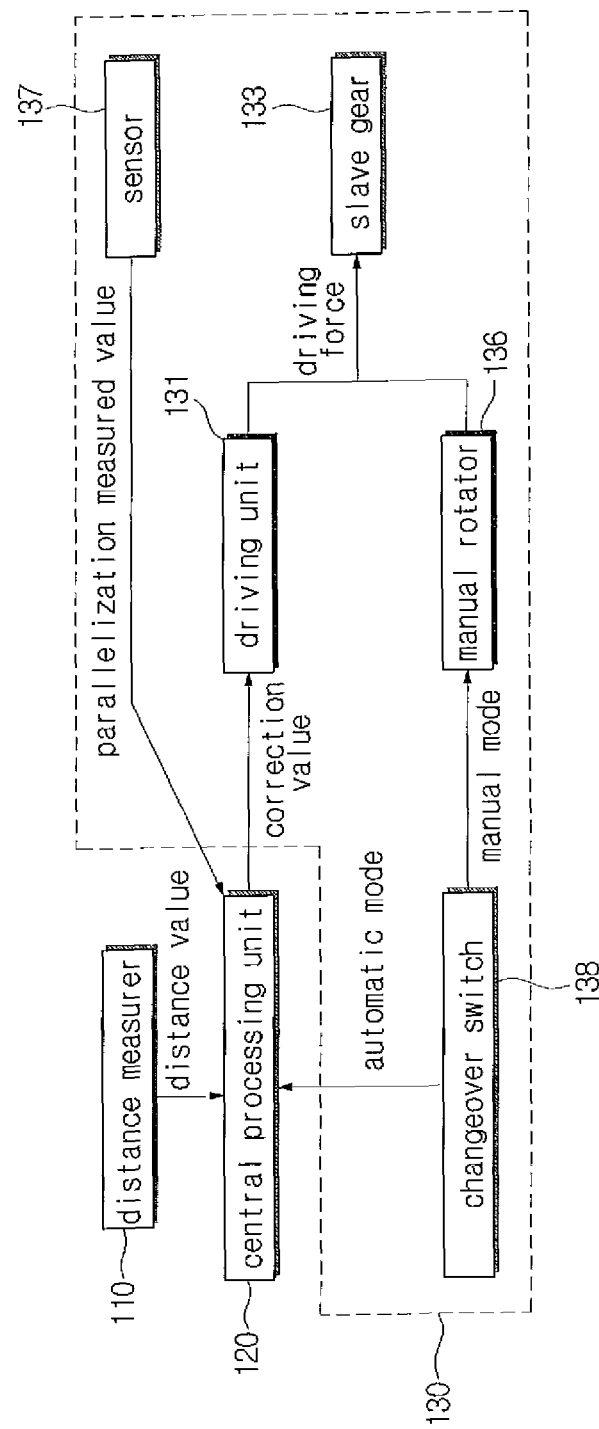
FIG. 4 is a schematic view of an automatic correction apparatus for a trajectory of a projectile according to an exemplary embodiment of the present invention.
Figure 5:
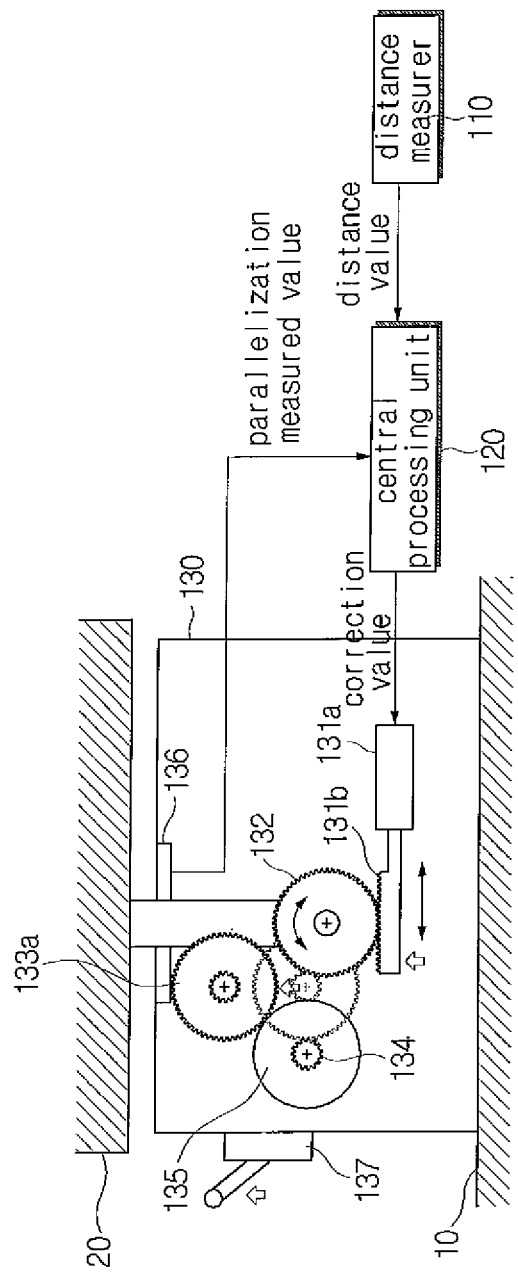
FIG. 5 is an enlarged cross-section view showing that a parallelization adjuster according to an exemplary embodiment of the present invention is in an automatic mode.
Figure 6:
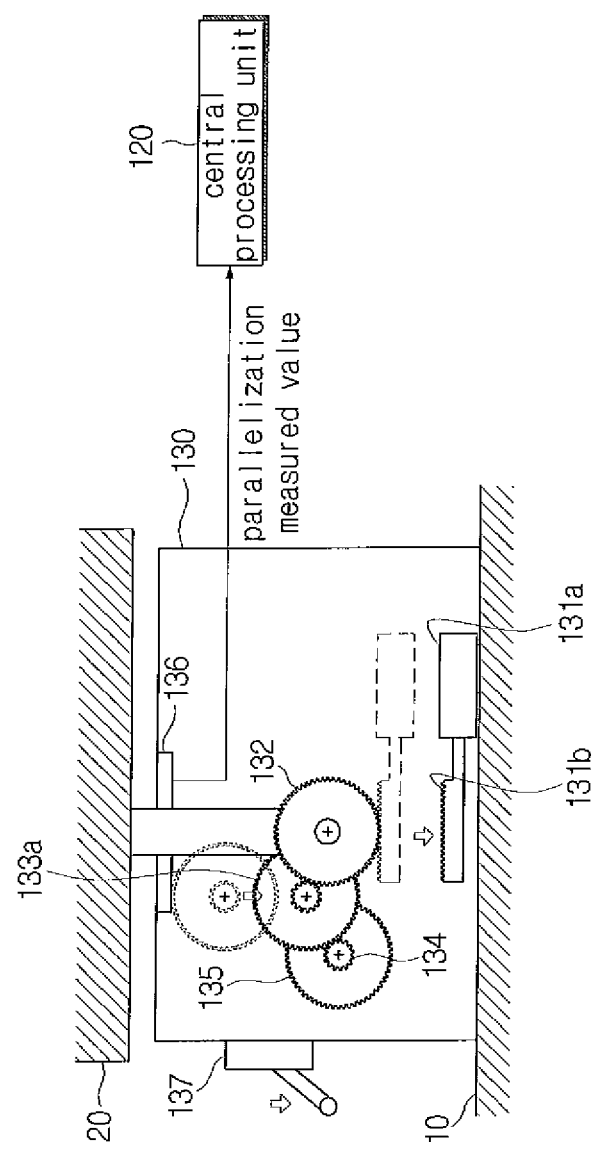
FIG. 6 is an enlarged cross-section view showing that a parallelization adjuster according to an exemplary embodiment of the present invention is in a manual mode.
Figure 7:
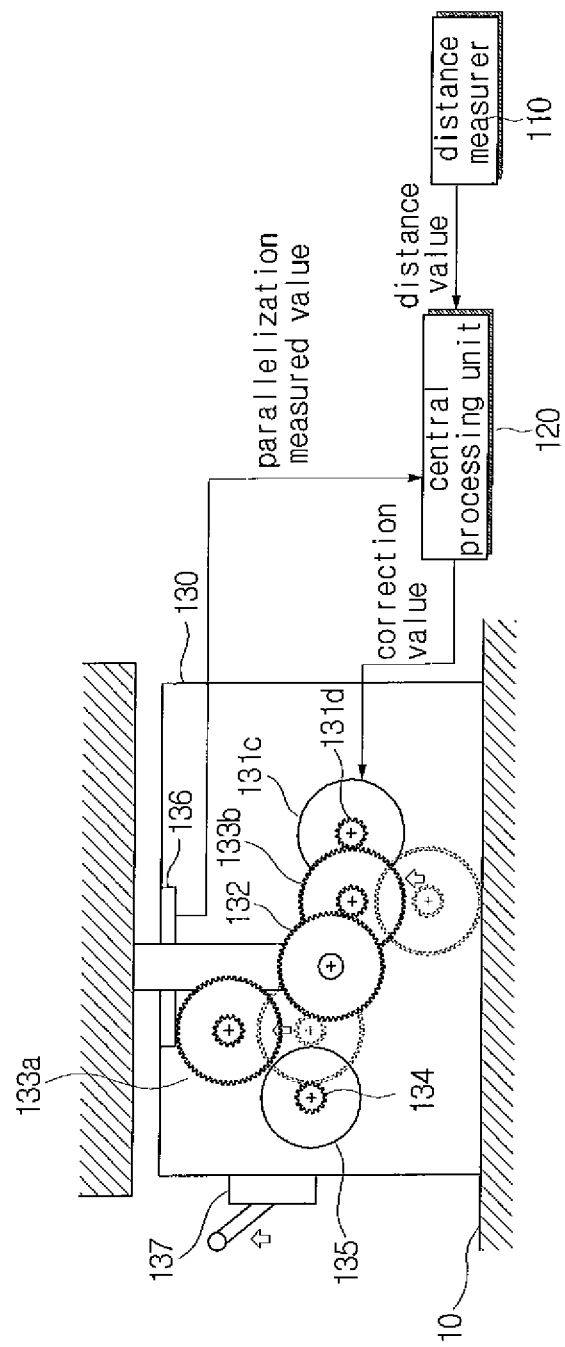
FIG. 7 is an enlarged cross-section view of a parallelization adjuster according to another exemplary embodiment of the present invention.

Among the accompanying drawings, FIG. 2 is a lateral view of an automatic correction apparatus for a trajectory of a projectile according to an exemplary embodiment of the present invention, FIG. 3 is a front view of an automatic correction apparatus for a trajectory of a projectile according to an exemplary embodiment of the present invention, FIG. 4 is a schematic view of an automatic correction apparatus for a trajectory of a projectile according to an exemplary embodiment of the present invention, FIG. 5 is an enlarged cross-section view showing that a parallelization adjuster according to an exemplary embodiment of the present invention is in an automatic mode, FIG. 6 is an enlarged cross-section view showing that a parallelization adjuster according to an exemplary embodiment of the present invention is in a manual mode, and FIG. 7 is an enlarged cross-section view of a parallelization adjuster according to another exemplary embodiment of the present invention.

As shown therein, an automatic correction apparatus for a trajectory of a projectile according to an exemplary embodiment of the present invention adjusts parallelization between a gun barrel 11 and a sight 20 of a firearm 10 so that a parabolic trajectory curve can intersect a target in accordance with distance from the target, which includes a distance measurer 110, a central processing unit 120 and a parallelization adjuster 130.

For example, the distance measurer 110 measures distance by calculating time of a laser beam taken in being emitted, reflected from the target and returned, and is installed in parallel with the sight 20 so that the sight line of the sight 20 can be parallel with the leaser beam of the distance measurer 110. In this exemplary embodiment, the distance measurer 110 employs a laser, but not limited thereto. Alternatively, the laser may be replaced by electromagnetic waves such as millimeter waves, ultrasonic waves, or the like for measuring the distance.

The central processing unit 120 calculates a correction value for parallelization between the firearm 10 and the sight 20 so that the trajectory curve can intersect the target on the basis of the distance from the target measured by the distance measurer 110. As a method for calculating such a parallelization correction value, there are a method of measuring the currently set parallelization between the firearm 10 and the sight 20, regards it as a reference, and calculating a relative correction value by adding or subtracting parallelization to or from the reference for making the trajectory curve and the target intersect with each other; a method of setting up predetermined parallelization between the firearm 10 and the sight 20 as a reference, and calculating an absolute correction value by adding or subtracting parallelization to or from the reference for making the trajectory curve and the target intersect with each other; etc.

The parallelization adjuster 130 is placed between the sight 20 and the firearm 10, and adjusts the axial parallelization between the sight line of the sight 20 and a gun barrel 11 of the firearm 10 in accordance with the parallelization correction value calculated by the central processing unit 120. The parallelization adjuster 130 includes a slave gear 142 fastened to the sight 20, a driving unit 131 engaged with the slave gear 132 and operating in accordance with the parallelization correction value, and a sensor 136 measuring parallelization between opposite fixed ends (the gun barrel and the sight) and transmitting it to the central processing unit 120.

Here, the driving unit 131 includes a leaner driving unit 131a such as a solenoidal actuator or a linear motor, which moves rectilinearly, and a rack 131b installed in a driving shaft of the linear driving unit 131a and engaged with the slave gear 132. Thus, if the linear driving unit 131a is driven forward and backward in accordance with the correction value provided from the central processing unit 120, the slave gear 132 engaged with the rack 131b rotates to adjust the parallelization between the firearm 10 and the sight 20.

Meanwhile, the parallelization adjuster 130 includes a manual rotator 135 rotating by a user's manipulation, a manual gear 134 formed coaxially with the manual rotator 135 and engaged with the slave gear 132, a reduction gear 133a provided between the manual gear 134 and the slave gear 132 for precisely controlling the parallelization, and a changeover switch 137 moving the position of the reduction gear 133a and the linear driving unit 131a so that only one driving force between the manual gear 134 and the linear driving unit 131a can be transmitted to the slave gear 132. Thus, the correction can be achieved by an automatic mode and a manual mode.

As shown in FIG. 4, in the state that the changeover switch 137 is in the automatic mode, if a measured the distance value of the target is transmitted from the distance measurer 110 to the central processing unit 120, the central processing unit 120 calculates a correction value for parallelization between the firearm 10 and the sight 20 and transmits it to the driving unit 131. Then, the driving unit 131 rotates forward and backward in accordance with such a correction value and thus transmits the driving force to the slave gear 132, thereby adjusting the parallelization between the firearm 10 and the sight 20.

In the state that the changeover switch 137 is in the manual mode, a user manually rotates the manual rotator 135 so that a rotational force of the manual rotator 135 can be transmitted to the slave gear 132, thereby adjusting the parallelization between the firearm 10 and the sight 20. At this time, the parallelization between the firearm 10 and the sight 20 is measured by the sensor 136 and provided to the central processing unit 120, so that a user can correctly adjust parallelization as desired in the manual mode.

That is, as shown in FIG. 5, if the changeover switch 137 is in the automatic mode, the reduction gear 133a placed between the manual gear 134 and the slave gear 132 moves (up) together with the rack 131b of the driving unit 131, and thus the manual gear 134 and the slave gear 132 are released from each other and the rack 131b of the linear driving unit 131a is engaged with the slave gear 132. In this state, the slave gear 132 rotates with respect to linear motion of the linear driving unit 131a, thereby adjusting the parallelization between the firearm 10 and the sight 20. At this time, the sensor 136 installed to sense a position of a connection member connecting the slave gear 132 and the sight 20 as shown in FIG. 5 measures the parallelization between the firearm 10 and the sight 20 on the basis of the position of the connection member and transmits it to the central processing unit 120.

Meanwhile, as shown in FIG. 6, if the changeover switch 137 is in the manual mode, the reduction gear 133a placed between the manual gear 134 and the slave gear 132 moves down together with the rack 131b of the linear driving unit 131a, and thus the rack 131b of the linear driving unit 131a and the salve gear 132 are released from each other and the reduction gear 133a is placed between the manual gear 134 and the slave gear 132 to thereby connect the manual gear 134 and the slave gear 132. In this state, if a user manually rotates the manual rotator 135, the slave gear 132 connected to the manual gear 134 through the reduction gear 133a rotates to thereby adjust the parallelization between the firearm 10 and the sight 20. Accordingly, it is possible to properly deal with various on-the-spot environments.

Also, the sensor 136 installed to sense a position of a connection member connecting the slave gear 132 and the sight 20 as shown in FIG. 6 measures the parallelization between the firearm 10 and the sight 20 on the basis of the position of the connection member and transmits it to the central processing unit 120. Thus, in the case of change from the manual mode to the automatic mode, the central processing unit 120 can ascertain the parallelization value changed in the manual mode, thereby preventing an error in switching between the manual mode and the automatic mode. Also, it is possible to ascertain the correction target value and the current parallelization value through a display unit of the sight 20 or a separate display unit, which displays the correction value calculated by the central processing unit 120 and the parallelization value measured by the sensor 136, or the like method, so that correct and quick adjustment is possible even in the manual mode.

In the foregoing exemplary embodiment, the linear driving unit 131a is used as the driving unit 131, but not limited thereto. Alternatively, as shown in FIG. 7, a rotating stepping motor, a rotary actuator, or the like rotary driving unit 131c may be used as the driving unit 131. In this case, a rotary shaft of the rotary driving unit 131c is ford is formed with a driving gear 131d, and a reduction gear 131d is placed between the driving gear 131d and the slave gear 132, so that the parallelization can be precisely adjusted. In this state, the reduction gear 133b placed between the manual gear 134 and the slave gear 132 and the reduction gear 133b placed between the driving gear 131d and the slave gear 132 are moved together with each other by manipulation of the changeover switch 137, thereby transmitting one of the driving forces from the manual gear 134 and the driving gear 131d to the slave gear 132.

Also, in the foregoing exemplary embodiment, the parallelization adjuster 130 moves the sight 20 in up and down directions. Further, the parallelization adjuster 130 for adjusting the sight 20 in left and right directions may be additionally provided to adjust the sight in the left and right directions.

Figure 8:
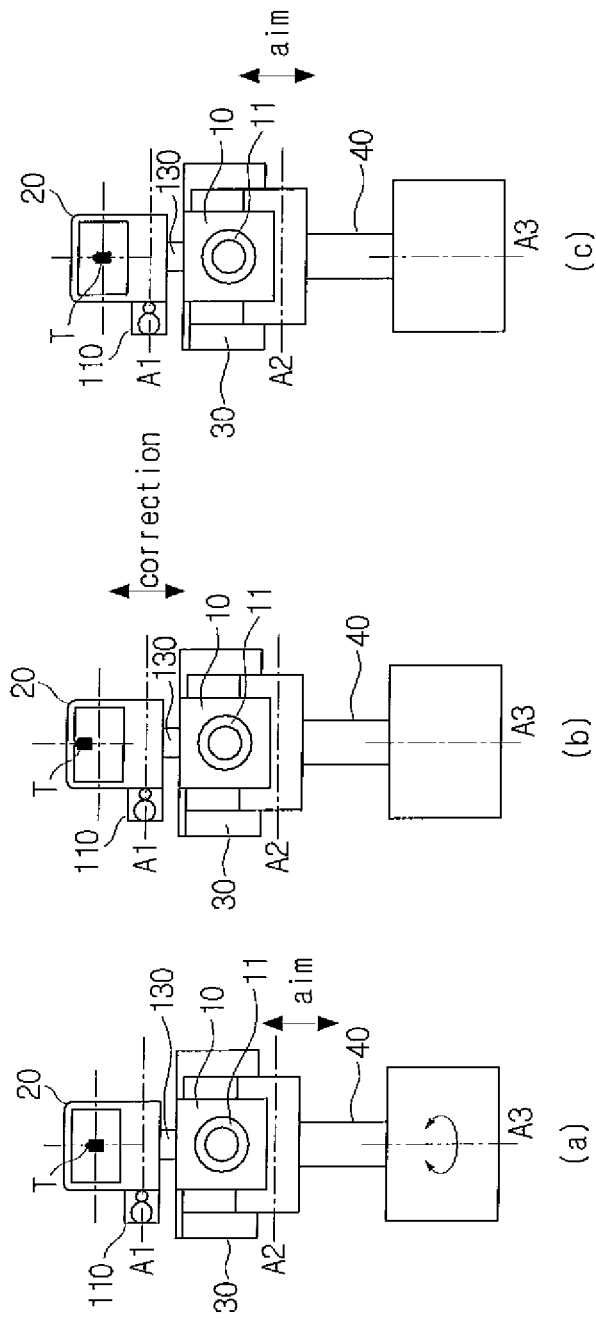
FIG. 8 is a view showing a sighting process according to a first use example of the present invention.
Figure 9:
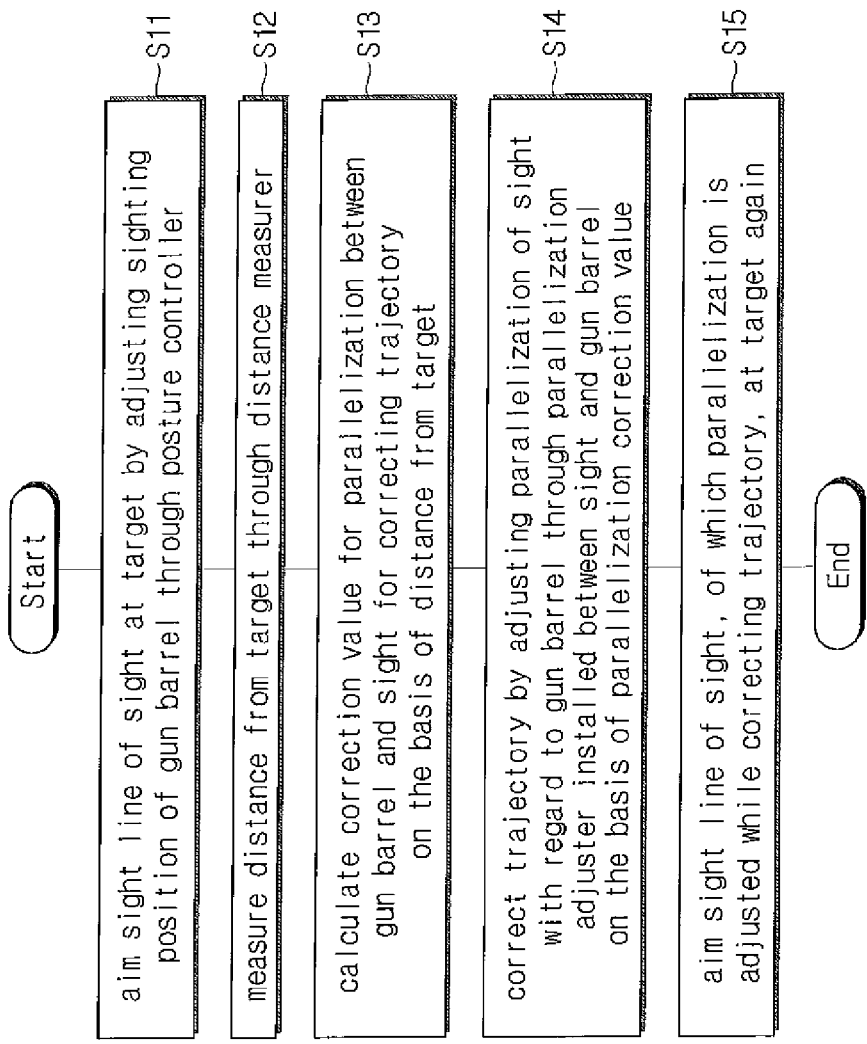
FIG. 9 is a flowchart of a correction method using an automatic correction apparatus for a trajectory of a projectile according to the first use example of the present invention.

Among the accompanying drawings, FIG. 8 is a view showing a sighting process according to a first use example of the present invention, and FIG. 9 is a flowchart of a correction method using an automatic correction apparatus for a trajectory of a projectile according to the first use example of the present invention.

First, in the state that the firearm 10 is directly connected to a base 40 movable in up, down, left and right, i.e., all directions, and the sight 20 is installed on the top of the firearm 10, the sight line of the sight 20 is aimed to be aligned with the target T while adjusting the position of the firearm 10 through a posture controller 30 connected to a rear end side of the firearm 10 rotating with respect to a rotary shaft A2, A3 of the base 40 as shown in (a) of FIG. 8 (S11).

Then, if the distance from the target T is measured by the distance measurer 110 installed in parallel with the sight 20 as shown in (b) of FIG. 8 (S12), the central processing unit 120 calculates the correction value for the parallelization between the firearm 10 and the sight 20 (S13) so that the to trajectory curve can be aligned with the target in accordance with distances. In accordance with the correction value, if the parallelization adjuster 30 placed between the sight 20 and the firearm 10 is driven, the parallelization between the firearm 10 and the sight 20 is adjusted with respect to the rotary shaft A1 of the parallelization adjuster 130 (S14) and thus the trajectory is corrected so that the sight line of the sight 20 can intersect with the trajectory curve of the firearm 10 with respect to the distance from the target T.

At this time, in the state that the firearm 10 is directly supported on the base 40 and the sight 20 is installed on the top of the firearm 10, if the parallelization adjuster 130 placed between the firearm 10 and the sight 20 for correcting the trajectory is driven to rotate the sight 20 fastened to the firearm 10 with respect to the axis A1, the sight line of the sight 20 goes beyond the target. Accordingly, as shown in (C) of FIG. 8, the posture controller 30 fastened to the firearm 10 moving with respect to the rotary shafts A2, A3 of the base 40 is used to adjust the position of the firearm 10 and aim at the target T again (S15), so that the sight line of the sight 20 can be aligned with the target T.

In this exemplary embodiment, the firearm 10 is supported on the base 40, but not limited thereto. Alternatively, in the case of a portable or mobile firearm 10 such as personal, middle and small weapons, the automatic correction apparatus for the trajectory of the projectile according to the preset invention may be installed on the top of the firearm 10, so that the parallelization between the sight 20 and the fire arm 10 can be adjusted in accordance with the distance from the target.

Next, an automatic correction apparatus for the trajectory of the projectile and a correction method using the same according to the second exemplary embodiment of the present invention will be described.

Figure 10:
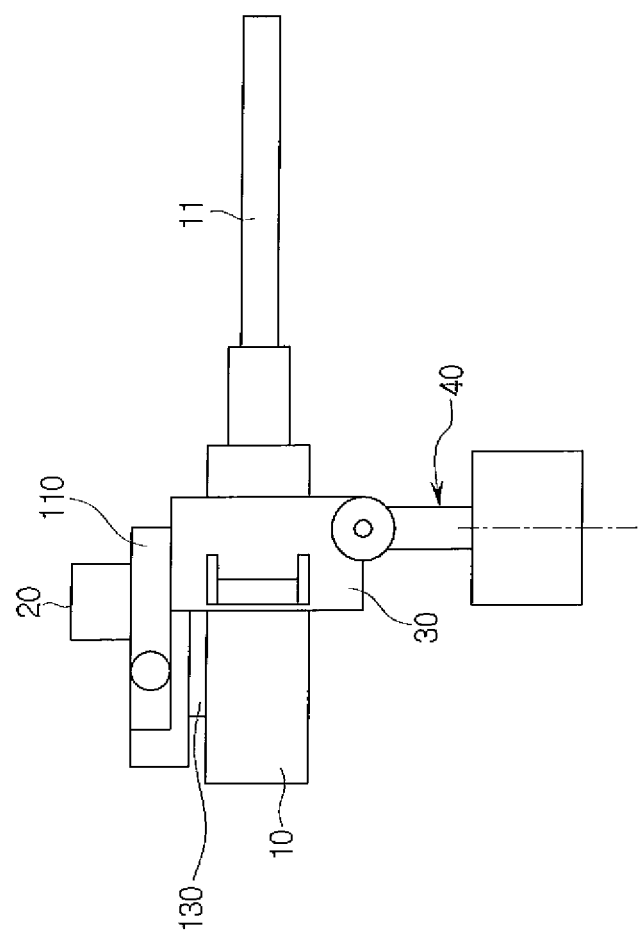
FIG. 10 is a lateral view according to a second use example of the present invention.
Figure 11:
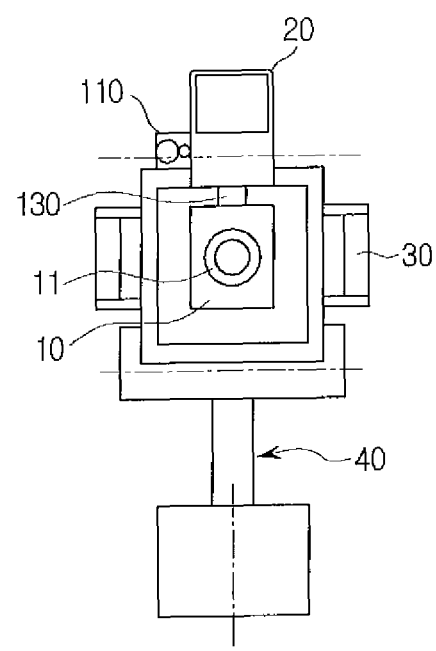
FIG. 11 is a front view according to the second use example of the present invention.
Figure 12:
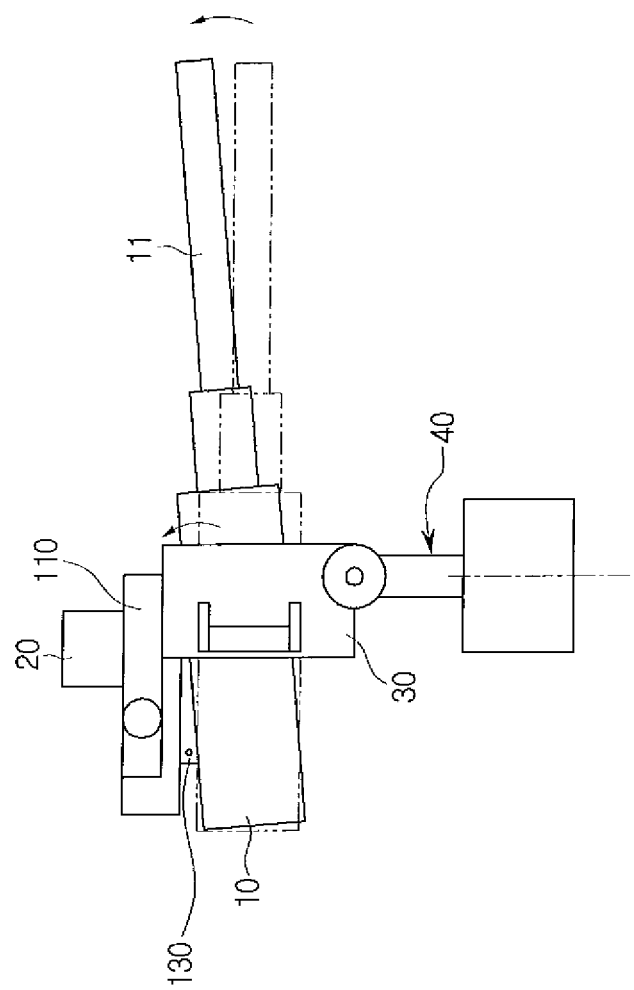
FIG. 12 is an operational view according to the second use example of the present invention.
Figure 13:
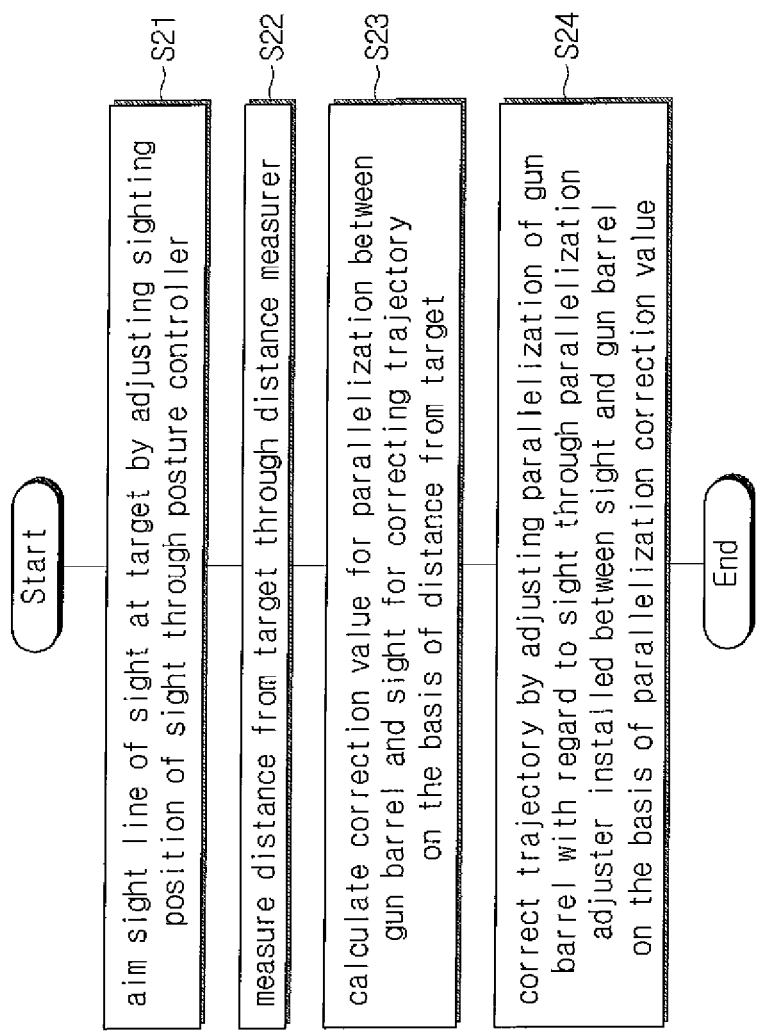
FIG. 13 is a flowchart of a correction method using an automatic correction apparatus for a trajectory of a projectile according to the second use example of the present invention.

Among the accompanying drawings, FIG. 10 is a lateral view according to a second use example of the present invention, FIG. 11 is a front view according to the second use example of the present invention, FIG. 12 is an operational view according to the second use example of the present invention, and FIG. 13 is a flowchart of a correction method using an automatic correction apparatus for a trajectory of a projectile according to the second use example of the present invention.

As shown therein, the automatic correction apparatus for the trajectory of the projectile according to the second exemplary embodiment of the present invention is different from that of the foregoing exemplary embodiment in the posture controller 30 fastened to the sight 20 and adjusting a sighting position of the sight 20, the base 40 supporting the posture controller 30 to be rotatable in up, down, left and right, i.e., all directions with respect to a bottom surface, and the parallelization adjuster 130 provided between the sight 20 and the firearm 10 and adjusting the parallelization between the sight 20 and the firearm 10.

In particular, the automatic correction apparatus for the trajectory of the projectile according to this exemplary embodiment is different from that of the foregoing exemplary embodiment in that the sight 20 is supported on the bottom through the posture controller 30 and the base 40, and the parallelization adjuster 130 is installed in the sight 20 and adjusts the parallelization between the sight line of the sight 20 and the firearm 10.

Thus, if the sight line of the sight 20 is aimed at the target through the posture controller 30, and the parallelization adjuster 130 is driven for correcting a trajectory, there is no need of aiming at the target again since the trajectory is corrected while the firearm 10 is moved from the sight 20 supported on the bottom.

In the correction method using the automatic correction apparatus for the trajectory of the projectile according to the second exemplary embodiment of the present invention, the posture controller 30 is supported on the base 40 movably in up, down, left and right directions, and used to adjust the sight line of the sight 20 to be aligned with the target (S21).

Then, the distance measurer 110 installed in parallel with the sight 20 is used to measure the distance from the target (S22), and the central processing unit 120 calculates the correction value for the parallelization between the firearm 10 and the sight 20 so that the trajectory curve can be aligned with the target on the basis of the distance measured by the distance measurer 110 (S23). In accordance with the correction values, the parallelization adjuster placed between the sight 20 and the firearm 10 is driven to adjust the parallelization between the firearm 10 and the sight 20 (S24) (refer to FIG. 12).

At this time, since the sight 20 is directly supported on the posture controller 30 fastened to the base 40 and the firearm 10 is installed beneath the sight 20 with the parallelization adjuster 130 therebetween, if the parallelization adjuster 130 is driven to correct the parallelization, the firearm 10 moves and corrects the trajectory in the state that the sight 20 is fixed.

As above, in the state that the sight 20 is supported on the bottom through the posture controller 30 and the base 40, and the firearm 10 is installed in the sight 20 via the parallelization adjuster 130, an initial sighting state of the sight 20 is not in disorder while adjusting the parallelization between the firearm 10 and the sight 20 in accordance with the distance from the target, and thus quick aim and firing are possible.

From now on, an automatic correction apparatus for the trajectory of the projectile and a correction method using the same according to the third exemplary embodiment of the present invention will be described.

Figure 14:
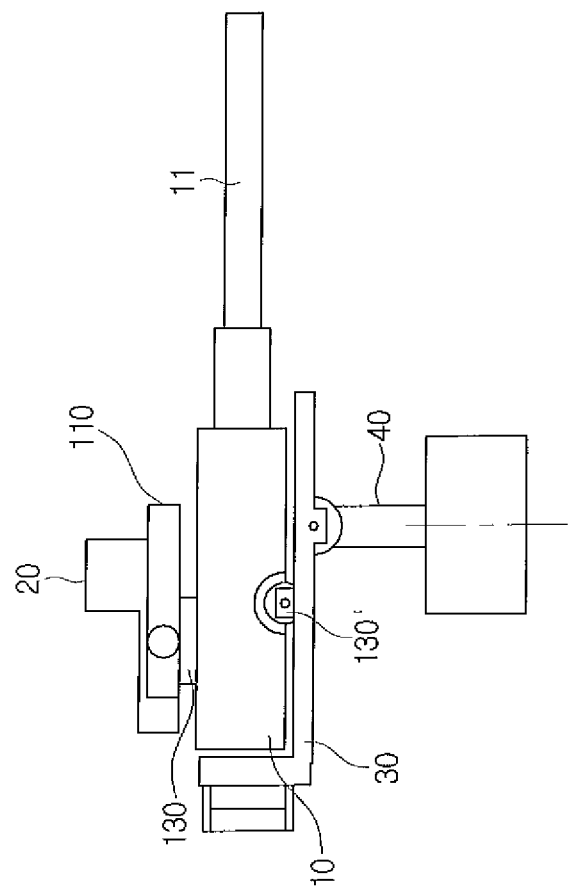
FIG. 14 is a lateral view according to a third use example of the present invention.
Figure 15:
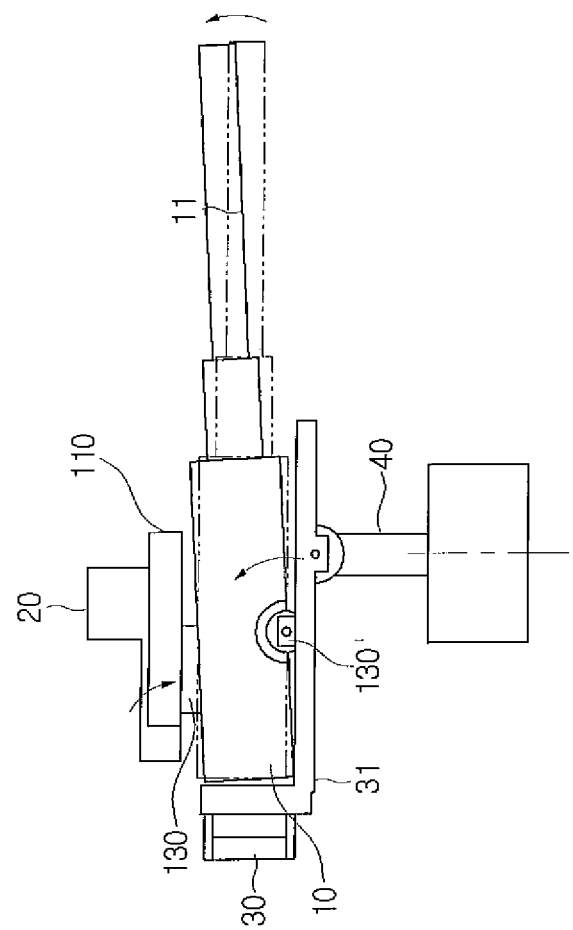
FIG. 15 is an operational view according to the third use example of the present invention.
Figure 16:
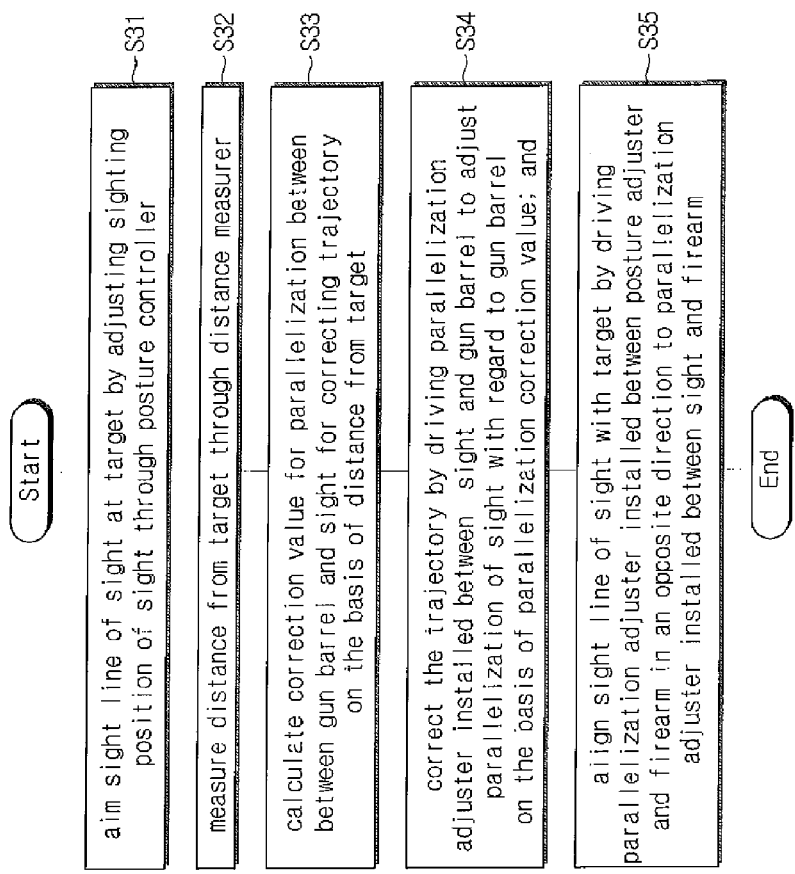
FIG. 16 is a flowchart of a correction method using an automatic correction apparatus for a trajectory of a projectile according to the third use example of the present invention.

FIG. 14 is a lateral view according to a third use example of the present invention, FIG. 15 is an operational view according to the third use example of the present invention, and FIG. 16 is a flowchart of a correction method using an automatic correction apparatus for a trajectory of a projectile according to the third use example of the present invention.

As shown in FIGS. 14 and 15, the automatic correction apparatus for the trajectory of the projectile according to the third exemplary embodiment of the present invention is different from those of the foregoing exemplary embodiments in that the parallelization adjuster 130 is installed between the firearm 10 and the sight 20 and a second parallelization adjuster 130' is installed between the firearm 10 and the base 40 and driven in a direction opposite to the parallelization adjuster 130 in the state that the firearm 10 is assembled in an upper side of the posture controller 30 supported on the base 40 to be rotatable in up, down, left and right, i.e., all directions from the bottom and the sight 20 is fastened on the top of the firearm 10.

In particular, the second parallelization adjuster 130' having the same configuration as the parallelization adjuster 130 provided between the firearm 10 and the sight 20 is placed between the firearm 10 and the posture controller 30 and configured to be driven in opposition to the parallelization adjuster 130 placed between the firearm 10 and the sight 20 with regard to the correction value of the central processing unit 120.

Accordingly, since the firearm 10 provided between the posture controller 30 and the sight 20 is placed between the parallelization adjuster 130 and the second parallelization adjuster 130' driven in directions opposite to each other, it is possible to prevent the sight line of the sight 20 from going beyond the target even though the position of the firearm 10 is adjusted while correcting the trajectory in accordance with the distance from the target.

In the correction method using the automatic correction apparatus for the trajectory of the projectile according to the third exemplary embodiment of the present invention, the posture controller 30 is supported on the base 40 movably in up, down, left and right directions, and used to adjust the sight line of the sight 20 to be aligned with the target (S31).

Then, the distance measurer 110 installed in parallel with the sight 20 is used to measure the distance from the target (S32), and the central processing unit 120 calculates the correction value for the parallelization of the sight 20 with regard to the gun barrel 11 of the firearm 10 so that the trajectory curve can be aligned with the target on the basis of the distance measured by the distance measurer 110 (S33). In accordance with the correction values, the parallelization adjuster placed between the sight 20 and the firearm 10 is driven to adjust the parallelization between the firearm 10 and the sight 20 (S34). Since the parallelization between the firearm 10 and the sight 20 is adjusted from the upper end part of the firearm 10 in the state that the firearm 10 is supported on the base 40, the target goes beyond the sight line while the position of the sight 20 is moved as described in the first exemplary embodiment. At this time, the second parallelization adjuster 130' placed between the posture controller 30 and the firearm 10 is driven in the opposite direction to the parallelization adjuster 130 placed between the firearm 10 and the sight 20, so that the position of the sight 20 can keep aiming at the original target (S35). Thus, it is possible to prevent the target from going beyond the sight line of the sight 20 (refer to FIG. 15).

As above, because the parallelization adjuster 130 for adjusting the parallelization between the sight 20 and the firearm 10 and the second parallelization adjuster for adjusting the parallelization between the posture controller 30 and the firearm 10 are driven in the opposite directions to each other with the firearm 10 therebetween, the sight line of the sight 20 is prevented from going beyond the target even though the trajectory is corrected in the state that the target is aimed by the posture controller 30, thereby quickly correcting the trajectory and precisely hitting the target.

As described above, according to an exemplary embodiment of the present invention, there is provided an automatic correction apparatus for a trajectory of a projectile, in which distance from a target is measured by a distance measurer, and parallelization between a gun barrel and a sight is automatically adjusted in accordance with the measured distance so that a trajectory curve can intersect the target, thereby making sighting and firing quick and correct.

According to another exemplary embodiment of the present invention, there is provided an automatic correction apparatus for a trajectory of a projectile, in which a sensor for sensing parallelization between a gun barrel and a sight so as to prevent an error in setting up the parallelization.

According to still another exemplary embodiment of the present invention, there is provided an automatic correction apparatus for a trajectory of a projectile, in which the parallelization is automatically and manually adjustable so as to effectively and well-directly dealing with various neighboring environments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An automatic correction apparatus for a trajectory of a projectile from a firearm, the apparatus comprising:
   a distance measurer that measures a distance from a target to be hit;

a sensor that physically measures inclination of a sight relative to a gun barrel;

a central processing unit which calculates a correction value used to adjust the inclination of the sight relative to the gun barrel on the basis of the distance measured by the distance measurer and the inclination of the sight relative to the gun barrel measured by the sensor; and an inclination adjuster that is arranged between the sight and the gun and adjusts the inclination of the sight relative to the gun barrel on the basis of the correction value calculated by the central processing unit and the inclination of the sight relative to the gun barrel as measured by the sensor.

2. The apparatus according to claim 1, wherein the inclination adjuster comprises a slave gear installed in the sight, and a driving unit engaged with the slave gear and driven on the basis of the correction value of the central processing unit.

3. The apparatus according to claim 2, wherein the inclination adjuster comprises a manual rotator to be rotated by manipulation of a user, a manual gear formed coaxially with the manual rotator and engaged with the slave gear, and a changeover switch controlling only one of the manual gear and the driver to be engaged with the slave gear.

4. The apparatus according to claim 2, further comprising a posture controller installed in the firearm and controlling a sighting position of the firearm.

5. The apparatus according to claim 2, further comprising:
a posture controller installed in the sight and controlling a sighting position of the sight; and
a base installed on a bottom and supporting the posture controller to be rotatable in all of up, down, left and right directions.

6. The apparatus according to claim 2, further comprising:
a posture controller installed in the firearm and controlling a sighting position of the gun barrel;
a base installed on a bottom and supporting the posture controller to be rotatable in all of up, down, left and right directions; and
a second inclination adjuster having the same configuration as the inclination adjuster installed between the firearm and the sight, installed between the posture controller and the firearm, and so that the sight line of the sight can be aligned with the target.

7. The apparatus according to claim 1, further comprising a posture controller installed in the firearm and controlling a sighting position of the firearm.

8. The apparatus according to claim 1, further comprising:
a posture controller installed in the sight and controlling a sighting position of the sight; and
a base installed on a bottom and supporting the posture controller to be rotatable in all of up, down, left and right directions.

9. The apparatus according to claim 1, further comprising:
a posture controller installed in the firearm and controlling a sighting position of the gun barrel;
a base installed on a bottom and supporting the posture controller to be rotatable in all of up, down, left and right directions; and
a second inclination adjuster having the same configuration as the inclination adjuster installed between the firearm and the sight, installed between the posture controller and the firearm, and so that the sight line of the sight can be aligned with the target.

* * * * *